Patented Nov. 5, 1946

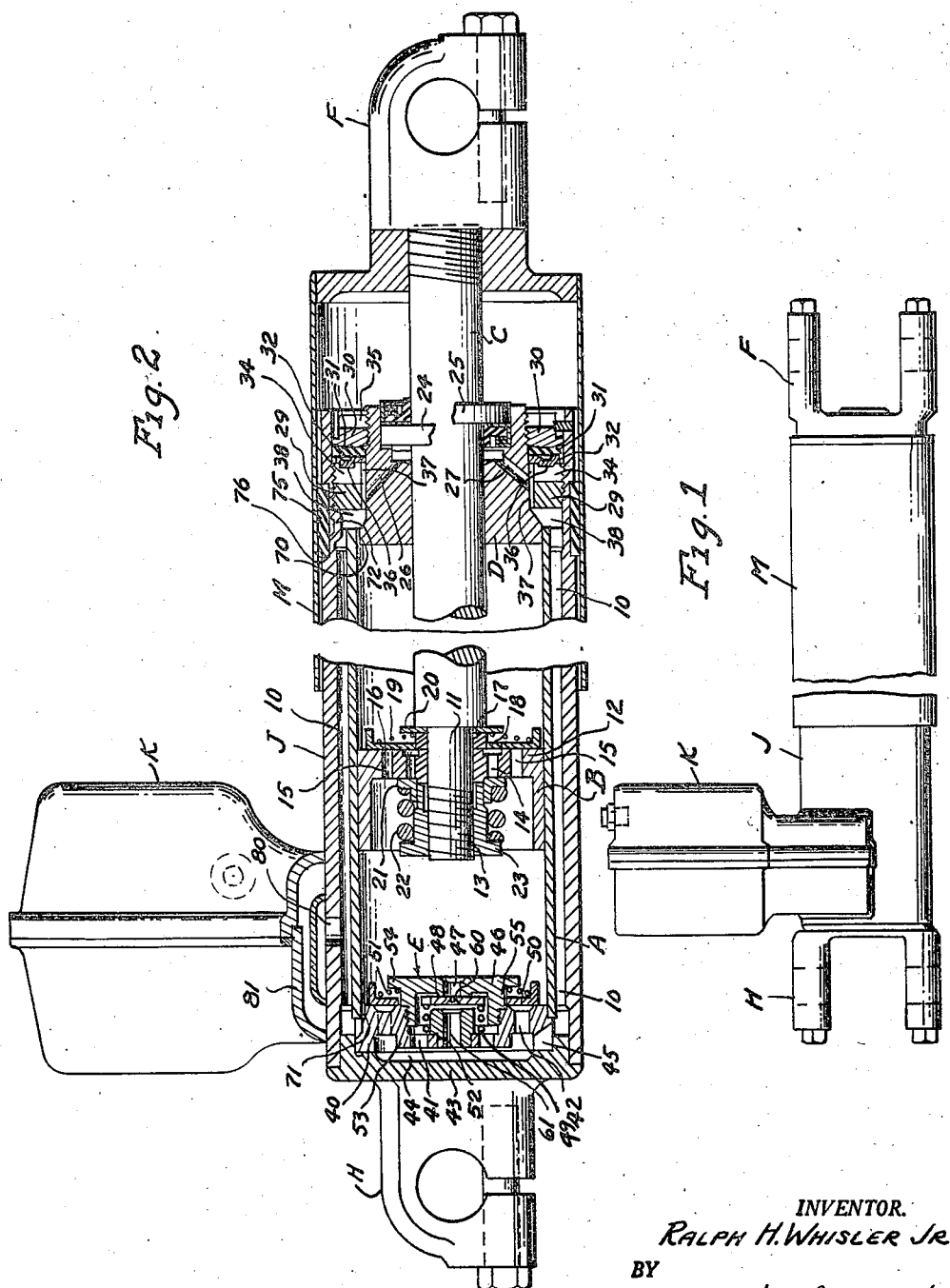

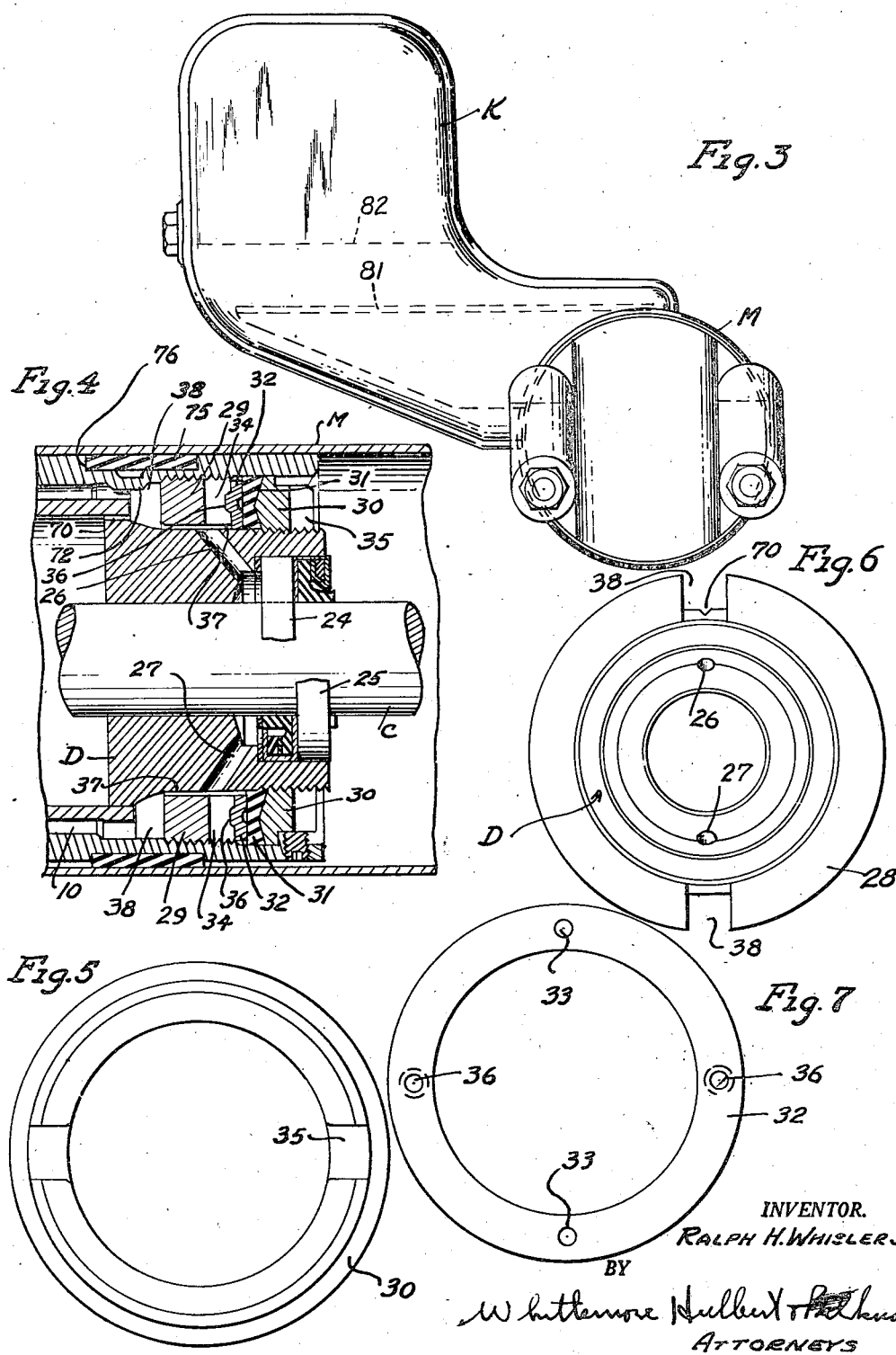

2,410,539

UNITED STATES PATENT OFFICE 2,410,539

SHOCK ABSORBER STRUCTURE

Ralph H. Whisler, Jr., Monroe, Mich., assignor to Monroe Auto Equipment Company, Monroe, Mich., a corporation of Michigan Application August 28, 1944, Serial No. 551,529

12 Claims. (Cl. 188—88)

This invention relates generally to shock absorbers and refers more particularly to hydraulic shock absorbers of the direct acting type.

One of the essential objects of the invention is to provide a shock absorber of the type mentioned capable of being installed in a substantially horizontal position upon vehicles to stabilize the action of relatively movable parts thereof. More specifically, it is an object to provide a shock absorber having an improved piston rod guide locking assembly.

Another object is to provide a piston rod guide that forms a closure for one end of the pressure cylinder of the shock absorber and is locked in place by cooperating elements forming a closure for the adjacent end of the reserve chamber.

Another object is to provide an assembly wherein a resilient gasket and a retaining washer for said gasket are clamped between adjustable inner and outer locking rings respectively that are attached to the closure and to a casing forming the outer wall of the reserve chamber.

Another object is to provide an assembly wherein the retaining washer for the gasket is provided with tool receiving holes and has projections so spaced relative to said holes and relative to suitable tool receiving slots in an adjacent retaining ring that such projections of the washer may be engaged with the slots in the retaining ring to prevent portions of the gasket from being compressed or forced through the tool receiving holes in the washer into the tool receiving slots in said locking ring. Thus the gasket is effectively protected and will provide a proper seal between the parts.

Another object is to provide an assembly wherein a flange of the closure member serves as an abutment or seat for the inner locking ring and contains slots that cooperate with a space between said locking ring and closure and with passages in the closure to conduct to the reserve chamber any hydraulic medium that may be scraped or wiped from the piston rod during movement thereof relative to said closure.

Another object is to provide an assembly wherein a projection or indentation of the casing forming the outer wall of the reserve chamber is engageable with one of the slots in the flange of the closure to align an air bleed notch in the closure with an air bleed notch in the body of the valve assembly at the other end of the reserve chamber.

Another object is to provide a compact assembly that is simple in construction, economical to manufacture, easy to install and efficient in operation.

Other objects, advantages and novel details of construction of this invention will be made more apparent as this description proceeds, especially when considered in connection with the accompanying drawings, wherein:

Fig. 1 is a fragmentary elevational view of a hydraulic shock absorber structure embodying my invention;

Fig. 2 is an enlarged fragmentary vertical longitudinal sectional view through the structure illustrated in Fig. 1;

Fig. 3 is an end view of the structure illustrated in Fig. 1;

Fig. 4 is an enlarged fragmentary longitudinal sectional view through the closure member D and associated parts;

Fig. 5 is a top plan view of the outer locking ring 30;

Fig. 6 is an end view of the closure member D, with the seal assemblies 24 and 25 respectively removed;

Fig. 7 is a plan view of the washer 32.

Referring now to the drawings, A is a pressure cylinder, B is a reciprocating piston in said cylinder, C is an actuating rod for the piston, D is a combination closure for one end of the cylinder and a guide for the rod, E is a valve assembly at the other end of the cylinder, F and H respectively are apertured attaching heads for the rod C and cylinder A adapted to be connected to relatively movable parts (not shown) of a vehicle, J is a tubular casing substantially concentric with the pressure cylinder A and cooperating therewith and with the head H and closure D to form a reserve chamber 10, K is an auxiliary chamber on top of and rigid with the casing J, and M is a dirt shield carried by the head F and substantially concentric with the casing J.

As shown, the piston B is mounted on a reduced inner end portion 11 of the rod C and slidably engages the inner walls of the pressure cylinder A. The head 12 of the piston is held on the rod C by a sleeve type nut 13 threadedly engaging the reduced portion 11 of the rod and has inner and outer passages 14 and 15 respectively therethrough for hydraulic medium in the cylinder A. A peripherally flanged disc valve 16 slidably mounted on a collar 17 on the reduced portion 11 of the rod controls the flow of hydraulic medium through the outer series of passages 15 on the compression stroke of the piston and has suitable openings 18 registering with the inner series 14 of passages. A coil spring 19 surrounding the collar 17 between the valve 16 and a washer 20 on the rod serves to normally hold the valve 16 in closed position against the head 12 of the piston.

A valve 21 slidable on the sleeve type nut 13 controls the flow of hydraulic medium through the inner series of passages 14 on the rebound stroke of the piston and is normally held in closed position by means of a coil spring 22 encircling the sleeve type nut 13 between a lateral flange 23 thereof and the valve 21.

The closure member D is within and constitutes an endwise extension of the cylinder A. Preferably the closure member D contains two seal assemblies 24 and 25 respectively engaging the piston rod C, and has inclined passages 26 and 27 for conducting to the reserve chamber 10 any hydraulic medium that may be scraped or wiped from the rod C by the seal assemblies 24 and 25.

Located between the closure member D and casing J, upon the outer side of an annular flange 28 of the closure member, are inner and outer locking rings 29 and 30 respectively, a resilient gasket 31, and a retaining washer 32 for the gasket. As shown, the inner locking ring 29 threadedly engages the casing J, while the outer locking ring 30 threadedly engages the closure member D. The gasket 31 is compressed between the outer ring 30 and washer 32.

In order that the washer 32 and the inner and outer locking rings 29 and 30 respectively may be adjusted into and out of assembled relation with the other parts, the washer 32 has suitable holes 33 for the reception of a suitable removing tool (not shown), and the rings 29 and 30 are provided with slots 34 and 35 respectively for receiving portions of a wrench or other suitable removing tool (not shown).

To prevent portions of the gasket 31 from being compressed or forced through the holes 33 in the washer 32 into the slots 34 in the inner locking ring 29 and thereby causing inadequate sealing, the washer 32 has suitable projections 36 that are spaced from the holes 33 and are received in the slots 34 in the inner locking ring when the parts are assembled. Thus the holes 33 in the washer 32 will be out of registration with the slots 34 when the projections 36 are received in said slots.

The inner locking ring 29 is spaced slightly from the closure member D to provide an annular passage 37 for hydraulic medium from the passages 26 and 27 respectively, and the flange 28 of the closure member is slotted at 38 to permit such hydraulic medium to pass therethrough to the reserve chamber 10.

The valve assembly E has a substantially cup shaped body 40 clamped between the cylinder A and attaching head H and provided with inner and outer passages 41 and 42 respectively for hydraulic medium. Preferably the body 40 is spaced from the central portion 43 of the head H to provide a recess 44, and is provided with one or more passages 45 extending between said recess 44 and the reserve chamber 10. A substantially cup shaped locking nut 46 threadedly engages the interior of the cup shaped body 40 and has a central passage 47 for hydraulic medium. A disc valve 48 controls the flow of hydraulic medium through the central passage 47 in the nut 46 during the compression stroke of the piston B and is normally held in closed position by a coil spring 49, while a disc valve 50 controls the flow of hydraulic medium through the outer passages 42 during the rebound stroke of the piston and is normally held in closed position by a coil spring 51. Preferably an abutment member or stop 52 for the valve 48 is pressed within the base 53 of the body 40 and serves to limit the opening movement of said valve. Such member 52 is within and serves as a guide for the coil spring 49. In fact this member 52, the spring 49 and the valve 48 are enclosed within a sectional housing formed by the body 40 and nut 46.

A lateral flange 54 of the nut 46 cooperates with the body 40 to limit movement of the spring 51 and valve 50. The annular part 55 of the nut 46 serves as a guide for both the valve 50 and spring 51 during movement thereof.

If desired the compression valve 48 may have a restricted central orifice 60 for hydraulic medium substantially in alignment with the passage 47 in the nut 46 and with a central passage 61 in the stop member 52 for said valve so that a restricted amount of hydraulic medium may flow through the orifice 60 from the cylinder A to the reserve chamber 10 and vice versa during reciprocating movement of the piston B in the cylinder.

The attaching head H is rigid with the casing J, while the head F is rigid with the piston rod C. The tubular dirt shield M is rigid with the head F and cooperates therewith to form an enclosure for the closure member D and associated parts.

In the present instance a pair of longitudinally aligned air bleed notches or grooves 70 and 71 respectively are provided in the closure member D and body 40 of the valve assembly, preferably at the top of the shock absorber, to permit air to escape from the interior of the cylinder A to the reserve chamber 10 during the compression and rebound strokes of the piston.

In order that the air bleed notch 70 in the closure member D will be in proper alignment with the notch 71 in the body 40 of the valve assembly when the parts are assembled, the casing J is provided at the top thereof with a projection or indentation 72 that is engageable with a slot 38 in the flange 28 of the closure member D. Thus, when the parts are assembled, the notches 70 and 71 will not only be in alignment but will be at the top of the casing J. Moreover, relative turning movement between the parts is prevented.

A mud wiper 75 of any suitable material such as wadding of fabric covers the indentation 72 and is anchored in a suitable recess 76 in the top of the casing J for wiping engagement with the dust shield M.

The auxiliary chamber K is in the form of a laterally projecting substantially L-shaped dome upon the top of the casing J and is preferably welded or otherwise rigidly secured thereto. An opening 80 in the casing J establishes communication between the interior of the reserve chamber 10 and the interior of the auxiliary chamber K; and an inverted substantially channel shaped shield or deflector 81 is fixed to the casing J over the opening 80 and projects laterally within the auxiliary chamber K. Normally the level of hydraulic medium in the auxiliary chamber K is approximately at the line 82. Thus the hydraulic medium will fill the reserve chamber 10 and partially fill the auxiliary chamber K, while air may collect in the top of the auxiliary chamber K above the level of hydraulic medium therein. As a result, the reserve chamber 10 and auxiliary chamber K collectively will have sufficient capacity to take care of the hydraulic medium in the shock absorber under all conditions of operation.

In use, the piston B will be on its compression stroke in the cylinder A when the attaching heads F and H at opposite ends of the shock absorber are moved toward each other by relatively movable parts of a vehicle (not shown) to which they are connected. On the compression stroke, the hydraulic medium in the cylinder A will flow through the outer passages 15 in the piston to open the valve 16, and will flow through the passage 47 in the nut 46 past the valve 48 and thence through the inner passages 41 in the body 40 of the valve assembly to the reserve chamber 10.

When the attaching heads F and H are moved away from each other by the relatively movable parts of the vehicle, the piston B will be on its rebound stroke and will cause hydraulic medium in the reserve chamber 10 to flow through the outer passages 42 in the body 40 of the valve assembly past the valve 50 to the interior of the cylinder A, and will cause hydraulic medium in the cylinder A to flow through the inner passages 14 in the piston B to open the valve 21. Thus the proper resistance in both directions will be properly afforded.

During the compression stroke, air in the cylinder A may escape through the notch 71 in the body 40 of the valve assembly to the reserve chamber 10 and thence through the opening 80 in the casing J to the interior of the auxiliary chamber K. During the rebound stroke, air in the cylinder A may escape through the notch 70 in the closure member D to the reserve chamber 10 and thence through the opening 80 in the casing J to the auxiliary chamber K.

What I claim as my invention is:

1. A hydraulic shock absorber having a pressure cylinder, a closure for one end of said cylinder projecting endwise therefrom, an outer tubular casing substantially concentric with said cylinder and closure, and means for locking said closure in assembled relation with said cylinder, including locking rings in the space between and threadedly engaging the casing and closure, and a gasket clamped between said rings.

2. A hydraulic shock absorber having a pressure cylinder, a closure for one end of said cylinder projecting endwise therefrom, an outer tubular casing substantially concentric with said cylinder and closure, and means for locking said closure in assembled relation with said cylinder, including locking rings fastened respectively to said casing and closure, a gasket clamped between said rings, one of said rings having tool slots therein opening toward said gasket, and means between the gasket and said one ring for preventing any portion of the gasket being compressed or forced into said slots.

3. A hydraulic shock absorber having a pressure cylinder, a closure for one end of said cylinder projecting endwise therefrom, an outer tubular casing substantially concentric with said cylinder and closure, and means for locking the closure in assembled relation with the cylinder including an assembly of relatively movable parts forming a closure for the space between the casing and closure aforesaid, one of said parts being fastened to the casing, and another of said parts being fastened to the first mentioned closure.

4. A hydraulic shock absorber having a pressure cylinder, a closure for one end of said cylinder projecting endwise therefrom, an outer tubular casing substantially concentric with said cylinder and closure, and means for locking the closure in assembled relation with the cylinder including an assembly of relatively movable parts forming a closure for the space between the casing and closure aforesaid, two of said parts being locking rings fastened respectively to said casing and first mentioned closure, one of said rings having tool receiving slots opening toward the other ring, and two of said parts being a gasket and a retaining washer for said gasket, the washer having tool receiving holes and having means engageable with the slots in said one locking ring to position the holes out of alignment with the slots and thereby prevent any portions of the gasket from entering the slots via said holes.

5. A hydraulic shock absorber having a pressure cylinder, an outer tubular casing substantially concentric with and projecting beyond an end of said cylinder, a piston slidable within and having a rod extending axially of the cylinder, a guide for said piston rod forming a closure for one end of said cylinder and projecting endwise therefrom within and substantially concentric with said outer casing, and means for locking the guide in assembled relation with the cylinder including an assembly of relatively movable parts forming a closure for the space between the guide and outer casing, one of said parts being fastened to the casing, and another of said parts being fastened to the guide.

6. A hydraulic shock absorber having a pressure cylinder, an outer tubular casing substantially concentric with and projecting beyond an end of said cylinder, a piston slidable within and having a rod extending axially of the cylinder, a guide for said piston rod forming a closure for one end of said cylinder and projecting endwise therefrom within and substantially concentric with said outer casing, two longitudinally spaced locking rings within the space between the guide and outer casing, one of said rings being fastened to the guide, the other of said rings being fastened to the outer casing, and a resilient gasket and a retaining washer for said gasket clamped between said locking rings and cooperating therewith to form a closure for the space between said guide and outer casing.

7. A hydraulic shock absorber having a pressure cylinder, a closure for one end of said cylinder projecting endwise therefrom, an outer tubular casing substantially concentric with said cylinder and closure, and means for locking the closure in assembled relation with the cylinder including an assembly of relatively movable parts forming a closure for the space between the casing and closure aforesaid, one of said parts being fastened to the casing, another of said parts being fastened to the first mentioned closure, another of said parts being a gasket between the two parts just mentioned, and another of said parts being a retaining washer for the gasket and disposed between the latter and one of the two parts aforesaid.

8. A hydraulic shock absorber having a pressure cylinder, a piston slidable within and having a rod extending axially of the cylinder, a guide for said piston rod forming a closure for one end of said cylinder and projecting endwise therefrom, an outer casing substantially concentric with said cylinder and guide, means for locking the guide in assembled relation with the cylinder including two longitudinally spaced locking rings within the space between the guide and outer casing, one of said rings being fastened to said outer casing, the other of said rings being fastened to said guide, said one locking ring being spaced slightly from the guide to provide a passage, the guide aforesaid having a passage for conducting hydraulic medium from the rod to the passage just mentioned, said guide also having a flange forming an abutment for said one locking ring, said flange having one or more slots for conducting hydraulic medium from the first mentioned passage to the space between the cylinder and outer casing, and means between said locking rings for preventing escape or leakage of hydraulic medium outwardly from the space between the guide and outer casing.

9. A hydraulic shock absorber having a pressure cylinder, a closure for one end of said cylinder projecting endwise therefrom, an outer tubular casing substantially concentric with said cylinder and closure, and means for locking said closure in assembled relation with said cylinder, including locking rings fastened respectively to said casing and closure, a gasket and a retaining washer for said gasket clamped between said rings, one of said rings having tool receiving slots therein opening toward said gasket, said washer having tool receiving holes, and projections on said washer spaced from said holes and engageable with said slots to locate the holes in said washer out of registration with said slots and thereby prevent any portion of the gasket from entering the slots via said holes.

10. A hydraulic shock absorber having a pressure cylinder, a closure for one end of said cylinder projecting endwise therefrom, an outer tubular casing substantially concentric with said cylinder and closure, and means for locking the closure in assembled relation with the cylinder including an assembly of relatively movable parts forming a closure for the space between the casing and closure aforesaid, one of said parts being fastened to the casing, another of said parts being fastened to the first mentioned closure, and another of said parts being a gasket between the two parts just mentioned.

11. A hydraulic shock absorber having a pressure cylinder, a piston slidable within and having a rod extending axially of the cylinder, a guide for said piston rod forming a closure for one end of said cylinder and projecting endwise therefrom, an outer casing substantially concentric with said cylinder and guide, means for locking the guide in assembled relation with the cylinder including two longitudinally spaced locking rings within the space between the guide and outer casing, one of said rings being fastened to said outer casing, the other of said rings being fastened to said guide, said one locking ring cooperating with the guide to provide a passage, the guide aforesaid having a passage for conducting hydraulic medium from the rod to the passage just mentioned, said guide also having one or more slots for conducting hydraulic medium from the first mentioned passage to the space between the cylinder and outer casing.

12. A hydraulic shock absorber having a substantially horizontal reserve chamber, the top wall of said chamber having a fluid opening, a dome covering and in open communication with said opening whereby fluid may travel through said opening between said reserve chamber and dome, said dome being substantially L shape and projecting laterally outward and upwardly from the top wall of said reserve chamber, the base portion of said L being mounted upon and rigidly secured to said top wall, and an inverted substantially channel shaped member projecting laterally from the top wall of said reserve chamber and disposed within and extending longitudinally of the base portion of said L shaped dome, said channel member extending over and serving as a covering for said opening, opposite sides of said channel member being rigidly secured to the top wall of said reserve chamber at opposite sides of said opening, the top wall of said channel member being near and substantially parallel to the top wall of said base portion of the L and extending longitudinally of said base portion throughout substantially its entire length, whereby said top wall of the channel member extends substantially across the open lower end of the upright portion of said L shaped dome, so that fluid will be deflected by said member lengthwise of said base portion in its travel between said opening and the upright portion of said dome.

RALPH H. WHISLER, Jr.